United States Patent [19]

Blough et al.

[11] 4,447,176

[45] May 8, 1984

[54] TEMPLATE FOR MORTICE CYLINDER LOCK REMOVAL

[76] Inventors: LeVone A. Blough, 95 Horseshoe Dr., Longwood, Fla. 32779; David L. Gregory, 10207 Union Park Dr., Orlando, Fla. 32817

[21] Appl. No.: 337,840

[22] Filed: Jan. 7, 1982

Related U.S. Application Data

[62] Division of Ser. No. 146,213, May 5, 1980, abandoned.

[51] Int. Cl.³ .............................................. B23B 49/02

[52] U.S. Cl. .................................................. 408/72 R

[58] Field of Search ............. 408/115 R, 115 B, 72 B, 408/72 R; 29/426.4

[56] References Cited

U.S. PATENT DOCUMENTS

| | | | |
|---|---|---|---|
| 2,423,164 | 7/1947 | Williams | 408/115 B |
| 2,424,485 | 7/1947 | Miller | 408/115 B |
| 4,261,093 | 4/1981 | Steffen et al. | 408/1 R |
| 4,307,983 | 12/1981 | Blough et al. | 408/72 B |

FOREIGN PATENT DOCUMENTS

| | | | |
|---|---|---|---|
| 548812 | 10/1942 | United Kingdom | 408/72 B |
| 594058 | 10/1947 | United Kingdom | 408/72 B |

*Primary Examiner*—William R. Briggs
*Attorney, Agent, or Firm*—Kenneth E. Darnell

[57] ABSTRACT

Apparatus for facilitating the removal and replacement of a standard mortice cylinder or mortice thumbturn, the invention provides template structure which allows a mortice lock to be drilled in order to cut away the set screw or cylinder yoke holding the cylinder in the door or other structure in which the lock is installed, the lock then being removed by separate structure. The present template particularly allows drilling of a mortice lock or similar locking apparatus with minimal damage to the lock face and without damage to the keyway, the expensive keyway thus being reusable.

5 Claims, 4 Drawing Figures

TEMPLATE FOR MORTICE CYLINDER LOCK REMOVAL

This is a divisional of application Ser. No. 146,213, filed May 5, 1980, now abandoned.

BACKGROUND OF THE INVENTION

1. Field of the Invention

The invention relates generally to apparatus for removal and replacement of mortice locks and similar locking structure with minimal damage to the lock. In particular, the invention relates to a drill template which allows rapid removal of the cylinder of a mortice lock without damage to the keyway.

2. Description of the Prior Art

Mortice and mortice thumbturn locks, as well as similar locking apparatus, are widely used, particularly in metal doors such as are common in commercial buildings including motels, hotels, stores, and the like. The mortice lock includes a cylinder which is held in the door by a set screw or cylinder yoke. From time to time, such locks need to be replaced for differing reasons. Various tools have previously been employed by the locksmith to remove such locks. These prior tools, which include pliers, vice grips, pipe wrenches, etc., unfailingly cause damage to and marring of the edges of the lock face. These previous practices typically result in the need for replacing the complete cylinder and, in many instances, the keyway itself which is expensive and often difficult to obtain since many such keyways are master keyed or otherwise keyed to form a part of a series of locks. Accordingly, in situations where mortice locks are to be removed, replaced or installed, it is desirable not only to cause as little cosmetic damage to the lock as possible, but is also necessary to prevent damage to the keyway due to the expense and difficulty of obtaining a new keyway or core which would have a pin setting compatible with locks already in place in a building or series of buildings. The present invention provides apparatus capable of facilitating the removal and replacement of standard mortice cylinder locks with minimal damage to the lock face and without damage to the core or keyway of the lock. Apparatus provided according to the invention includes a drill jig which allows the set screw or yoke of particular mortice locks to be cut away through the use of a simple drill.

SUMMARY OF THE INVENTION

The present invention provides particular apparatus which is useful for facilitating the removal and replacement of a standard mortice cylinder or mortice thumbturn both rapidly and without damage to the keyway or core of the lock. The invention includes a template structure or drill jig which fits over the face of the lock and allows exact positioning of a drill so that the end of a set screw holding the lock in a door can be cut away without damage to the keyway core of the cylinder, thereby saving the usually restricted and often difficult to obtain keyway so that the same pin setting can be reused in order to be compatible with other cylinder locks which are similarly keyed. The present drill template has one aperture extending normally therethrough to allow use with cylinders such as the Medico rim cylnder. A second aperture disposed on the other side of a central slot disposed in the template is angled for use with certain other mortice lock cylinders.

Once the head of the set screw has been cut away through the use of the drill template as aforesaid, a wrench structure configured according to the structure described in U.S. patent application Ser. No. 146,213, filed May 5, 1980, now abandoned, in favor of U.S. patent application Ser. No. 337,839, filed Jan. 7, 1982, can be used to remove the mortice cylinder even though the threads of the cylinder may be crossed or the cylinder corroded.

Accordingly, it is an object of the invention to provide apparatus for facilitating the removal and replacement of a standard mortice cylinder or mortice thumbturn lock with a minimum of damage to the lock face and without damage to the keyway core of the lock, thereby enabling the reuse of the pin setting.

The invention further provides a drill template which allows accurate and reproducible positioning of a drill for cutting away the set screw or cylinder yoke holding the cylinder of a mortice lock in a door or other structure in which the lock is installed, the template having at least two location apertures in order to accommodate differing lock conformations including pick-resistant locks, these locks being drilled through use of the present template with only minor damage to the lock face and with a greatly reduced possibility for damaging the lock keyway or core.

Further objects and advantages of the invention will become more readily apparent in light of the following detailed description of the preferred embodiments.

DESCRIPTION OF THE PREFERRED EMBODIMENTS

Figure 1:
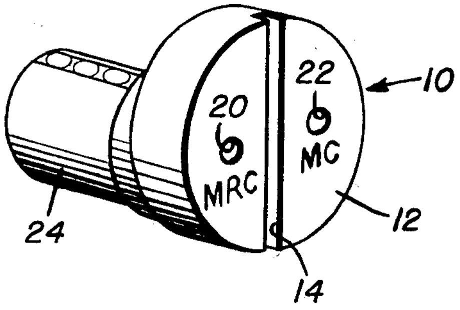
FIG. 1 is a perspective view of the drill template configured according to the present invention, the template being located over the face of a lock cylinder in a use situation.
Figure 2:
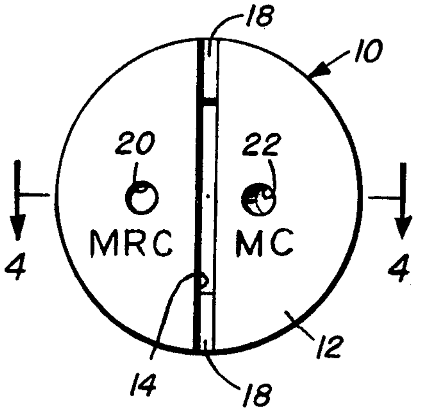
FIG. 2 is an elevational view of one face of the template.
Figure 3:
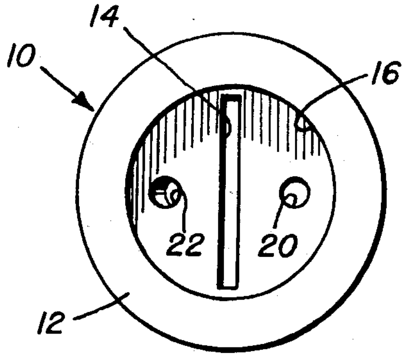
FIG. 3 is an elevational view of the opposite face of the template.
Figure 4:
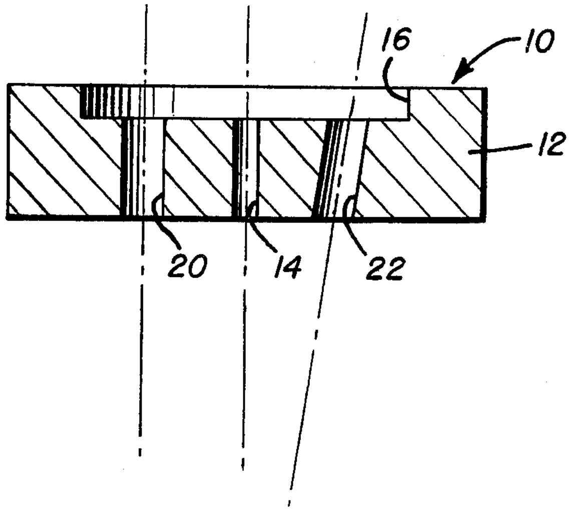
FIG. 4 is a sectional view taken along lines 4—4 of FIG. 3 and particularly illustrating the angle of the location apertures within the body of the template.
Figure 5:
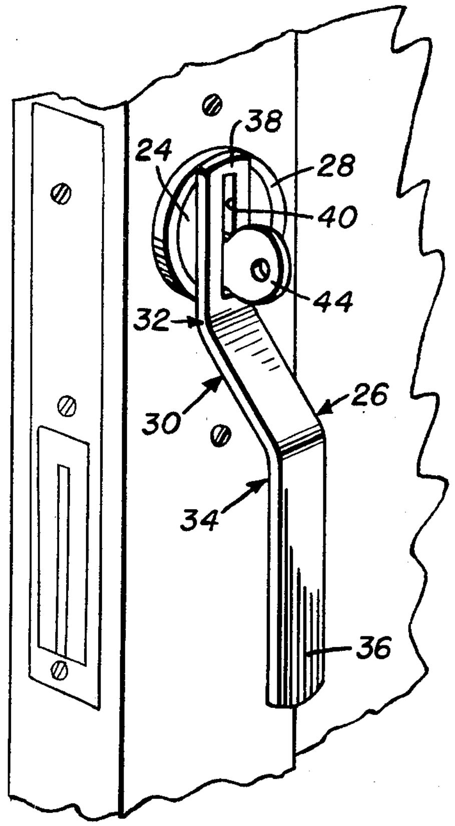
Figure 6:
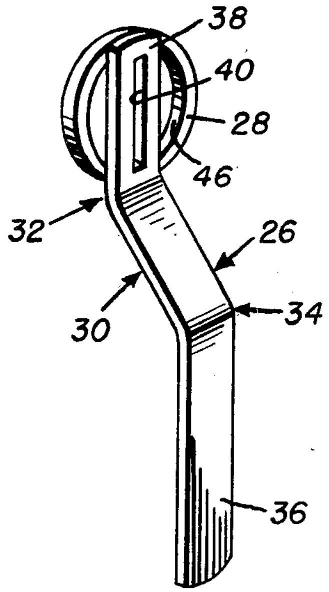
Figure 7:
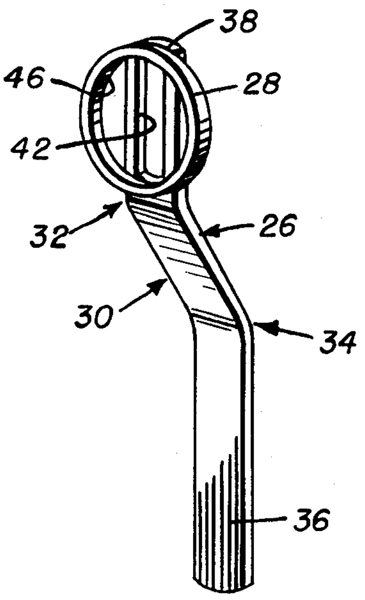

Referring to the drawings, and particularly to FIGS. 1–4, a drill template is seen generally at 10 to comprise a disc-like body member 12 having a diametrical slot 14 disposed in one face thereof. Medial portions of the slot 14 extend through the body member 12 to communicate with a central circular recess 16 formed in the other face of the body member 12. As can particularly be seen in FIG. 3, the medial portion of the slot 14 which extends fully through the body member 12 is less than equal in length to the diameter of the recess 16. As seen in FIG. 2, the sot 14 extends the full diameter of the first-mentioned face of the body member 12. Accordingly, the slot 14 is bounded interiorly of the body member 12 by sloping internal surface 18. Location apertures 20 and 22 are seen to be disposed on either side of the slot 14 and extend through the body member 12 of the template 10. The apertures 20 and 22 are seen to have a line of centers which fall on a diameter of the body member 12 which is perpendicular to the longitudinal axis of the slot 14. The openings of each of the apertures 20 and 22 disposed within the recess 16 are seen to be essentially equidistant from the longitudinal axis of the slot 14. As can particularly be seen in FIG. 4, the location aperture 20 extends through the template 10 in a substantially perpendicular fashion, the longitudinal axis of the essentially circular aperture being parallel to the longitudinal axis of the essentially cylindrical body member 12. However, the location aperture 22 is seen to be angled slightly relative to the longitudinal axis of the body member 12, the nominal longitudinal axis of the location aperture 22 forming an angle with the longitudinal axis of the body member 12 of approximately 1°30′.

The drill template 10 is typically sized to have a diameter of approximately 1.75 inches and a height of approximately 0.5 inch. The depth of the circular recess 16 is approximately 1/10 inch and the diameter of the recess 16 is approximately 1.37 inches. The length of the slot 14 at the intersection thereof with the recess 16 is preferably taken to be 1.27 inches. The width of the slot 14 itself is preferably taken to be 1/10 inch. The diameter of the location apertures 20 and 21 are preferably both 0.188 inch. The template 10 is preferably formed of carburized and case-hardened steel which is chrome plated.

Referring again to FIG. 2, the location aperture 20 is seen to be marked with the code MCR which designates the location aperture 20 as being that aperture which is to be used as the drill hole for drilling out the set screws on a Medico rim cylinder. The location aperture 22 marked with the legend MC is used as the drill hole in order to cut away the end of a set screw in a standard mortice cylinder. If the face of a mortice cylinder is hardened, the location apreture can be used to drill to the set screw, a probe or punch being subsequently used to drive the set screw off to remove that structure which holds the cylinder to the door or other structure within which the lock is disposed. It is to be noted that the location aperture is slightly angled in order that the lock 24 as seen in FIG. 1 can be properly drilled to prevent damage to the keyway core of the cylinder and to allow the pin setting thereof to be used. It is particularly necessary to save the keyway core and pin setting of a mortice lock during removal of the lock particularly when the pin setting is keyed to Medico locks, master keyed locks, or grand master keyed locks. Damage to such a keyway during removal requires that a restricted or difficult to obtain keyway be purchased in order to be compatible with other locks of a security system. Removal of the lock 24 without damage to the keyway is therefore essential. In most standard mortice cylinders, the mounting screw (not shown) which is to be removed will be on one side or the other, it being necessary only to turn the template 10 over in order to properly locate the apertures 20 or 22 for drilling. The template 10 is turned to the right or left depending upon the hinging and opening of the door within which the lock is installed. The slot 14 allows a blank key or cut key to be inserted in the keyway for alignment purposes during use of the template 10.

Use of the template 10 with a standard electrical or other drill (not shown) results in minor damage to the face of the lock, the hole thus formed in the lock face being readily plugged. Alternatively, the case of the lock can be replaced with repinning of the keyway to the original setting. The template 10 thus allows drilling through the face of the lock to cut the end of a set screw holding the lock in the door or allows driving of a punch through a hole previously drilled through the template 10 in order to allow the opening of pick-resistant cylinder locks. The template 10 particularly allows drilling at a location of the usual lock where no hard material is provided. The template 10 is thus particularly valuable when a mortice cylinder lock is "pick-resistant" or "pick-proof". Drilling of the lock to defeat the holding action of the set screw thus occurs with a significantly reduced potential for damage to the keyway or core of the lock 24.

A cylinder wrench such as originally disclosed in U.S. patent application Ser. No. 146,213, filed May 5, 1980, now abandoned in favor of U.S. patent application Ser. No. 337,839, filed Jan. 7, 1982, can be used to remove the mortice lock 24 after a holding set screw has been removed by drilling of the lock as described above through use of the drill template 10.

It is believed apparent that the concepts illustrated herein can be practiced other than as expressly described without departing from the scope of the invention. Accordingly, the invention is intended to be understood in light of the description provided herein, but is to be properly limited in scope only by the recitations of the appended claims.

What is claimed is:

1. A drill template for facilitating the removal of a cylinder of a mortice or similar lock from a structure in which the lock is installed, comprising template means for aligning the drill on the face of the lock, the template means having at least one aperture formed therein to allow cutting away of a fastener holding the lock and the structure by drilling through the aperture formed in the template means, the template means comprising a body member having a disclike conformation and having a first, inner face engageable with the lock, the first face of the body member having a central circular recess formed therein, the body member having a slot formed in a second, outer face of said body member, the slot extending through the body member and opening on the first face of said body member, the slot further extending diametrically across the second face of the body member and communicating with the recess over less than the full diameter of said recess, the aperture positioning a drill for cutting of the fastener on positioning of the template over the lock to allow the fastener to be cut away without damage to internal keyway structure of the lock.

2. The drill template of claim 1 wherein the aperture extends through the body member and is disposed eccentrically of and normal to the faces thereof.

3. The drill template of claim 2 wherein the template means has a second aperture formed in the body member, the second aperture being disposed eccentrically of and at an angle to the faces thereof.

4. The drill template of claim 3 wherein the longitudinal axis of the second aperture is disposed at an angle of 1.5° to a line normal to the plane in which the faces of the body member lie.

5. The drill template of claim 3 wherein the two apertures are disposed equidistantly from the slot on opposite sides thereof and along a line of centers which is perpendicular to the longitudinal axis of the slot.

* * * * *